Jan. 18, 1966 R. E. NORWOOD 3,229,705

FLUID MEMORY

Filed March 29, 1963 3 Sheets-Sheet 1

INVENTOR
RICHARD E. NORWOOD

BY

ATTORNEY

Jan. 18, 1966 R. E. NORWOOD 3,229,705

FLUID MEMORY

Filed March 29, 1963 3 Sheets-Sheet 3

3,229,705
FLUID MEMORY

Richard E. Norwood, Endicott, N.Y., assignor to International Business Machines Corporation, New York, N.Y., a corporation of New York

Filed Mar. 29, 1963, Ser. No. 268,948
11 Claims. (Cl. 137—81.5)

Figure 1:
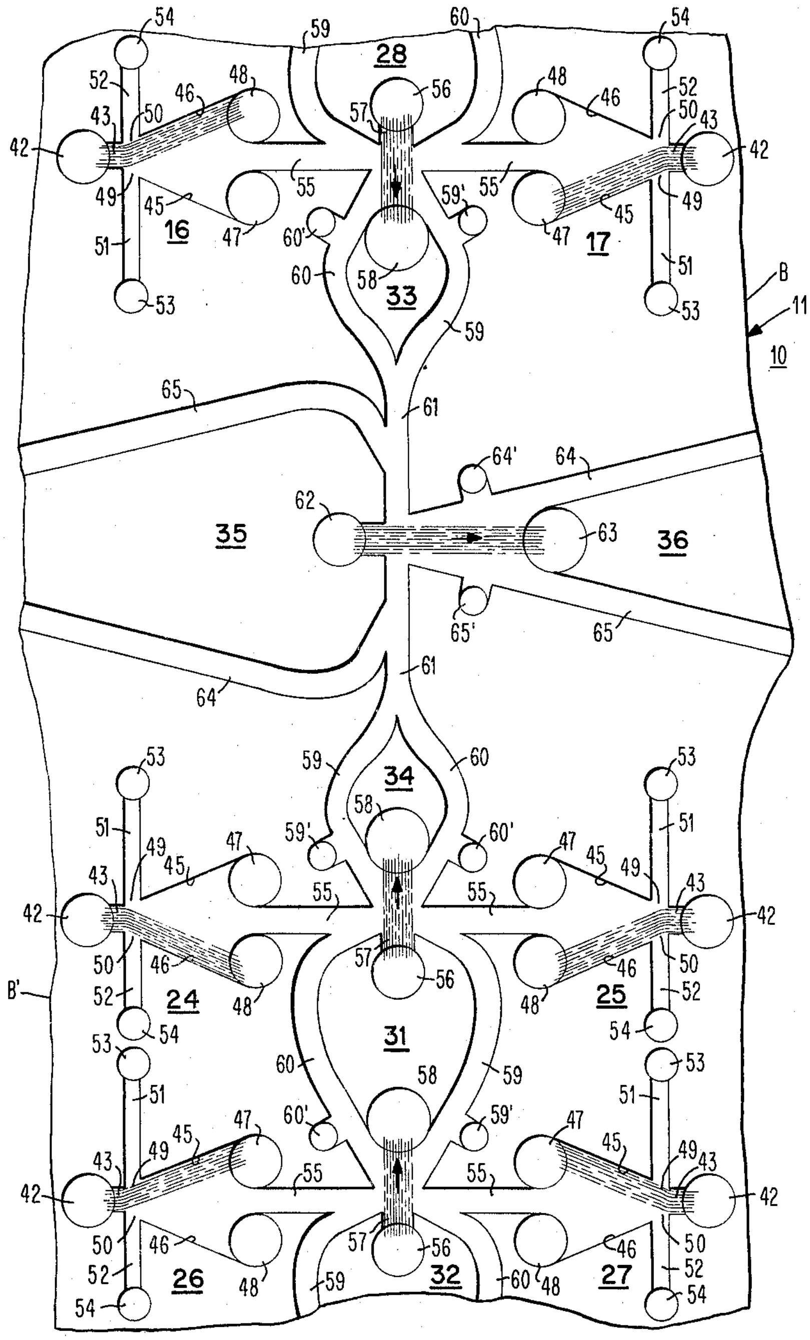

This invention relates to a fluid memory, and more particularly to one wherein a transient fluid pressure pulse is generated whenever a bistable fluid logic storage element is switched from one state to another and thus indicates the presence of a desired bit of information.

In recent years considerable interest has been shown in fluid logic elements which embody no moving parts and have been termed "fluid amplifiers." These elements are so named because a low enrgy fluid input signal can switch to a selectable outlet a higher energy fluid stream that can be used to provide an input signal to one or more other fluid logic elements. Basic fluid logic elements have been modified to form oscillators and interconnected and cascaded to form binary counters. But, so far as is known, no practical fluid memories have thus far been developed.

One object of this invention is therefore to provide a low cost, highly reliable, selectively addressable fluid memory which operates at higher speeds than possible with non-electronic memories embodying movable parts.

Another object is to provide a fluid memory wherein pressure output signal is obtained only when a desired bit of fluid logic information is found upon sensing of a fluid logic storage element.

According to these objects, the fluid memory embodying the invention comprises a plurality of bistable fluid logic storage elements each having two spaced outlets into which a fluid power stream is selectively switchable to represent the presence or absence of a bit of binary information. Suitable means provide input signals to switch the stream in any one of the storage elements selectively to one or the other of said two outlets. Whenever a particular stream is switched, and irrespective of the direction is which it is switched, a transient pulse will be produced in a third outlet or channel disposed between the said two outlets. The transient pulse emitted from any one element will be amplified and propagated by suitable propagating elements and transmitted to a single output line leading to a utilization device.

Switching of the stream in each storage element preferably is controlled by supply of pressure fluid selectively to one or the other of two control ports disposed at opposite sides of the stream upstream of the outlet. Supply of pressure fluid to selected control ports is effected by concurrent supply of pressure fluid streams to corresponding coincident X and Y grid co-ordinate channels, such that the momentum of the colliding intersecting streams produces a fluid flow substantially at right angles to the said channels and into the selected control port to divert the corresponding power stream to the proper outlet.

In any event, when a fluid pressure input signal or pulse is supplied to a particular control port, the power stream in the particular storage element will be switched only if the information sought is actually present. For example, the stream will be switched from the "1" state to the "0" state by the input signal or control pulse only if it was in the "1" state when the pulse was received. If it is already in the "0" state, it will not be switched. Hence, the transient pulse and thus the output signal will be emitted only if the power stream in the particular storage element had been in the "1" state and, in switching to the "0" state, developed the output signal-producing transient pulse.

Figure 2:
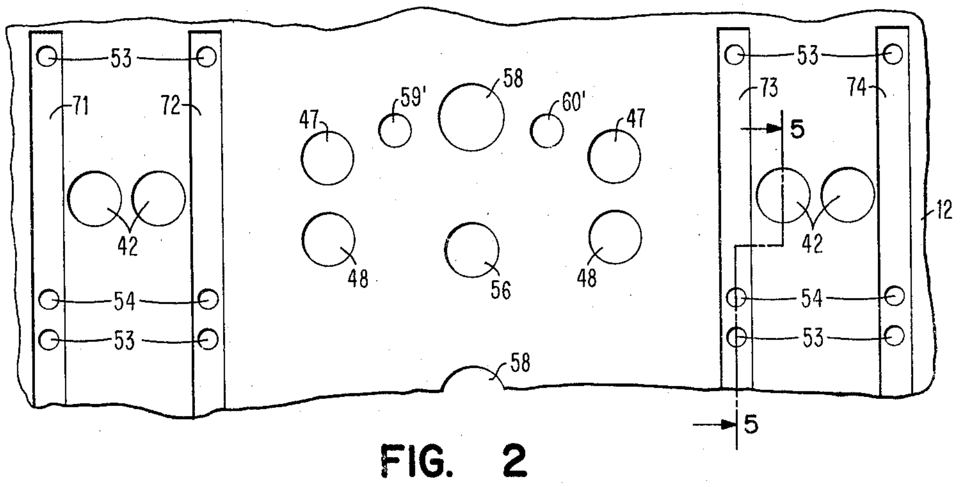
Figure 3:
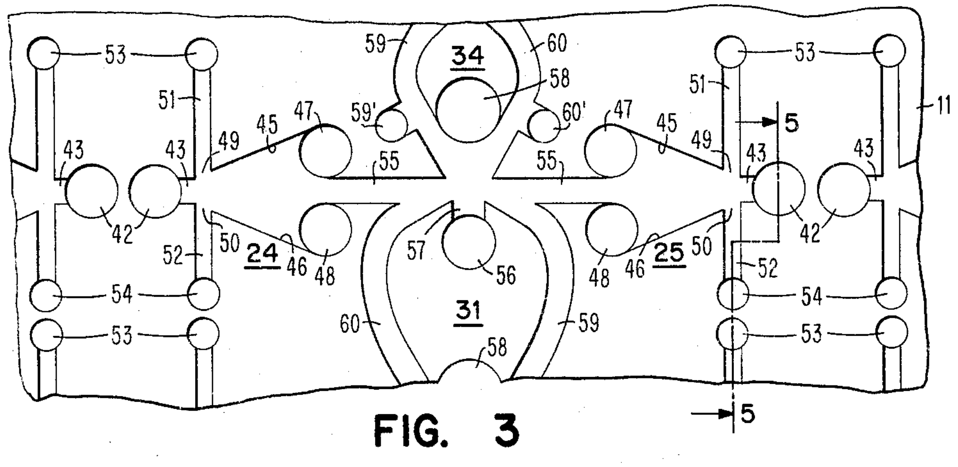
Figure 4:
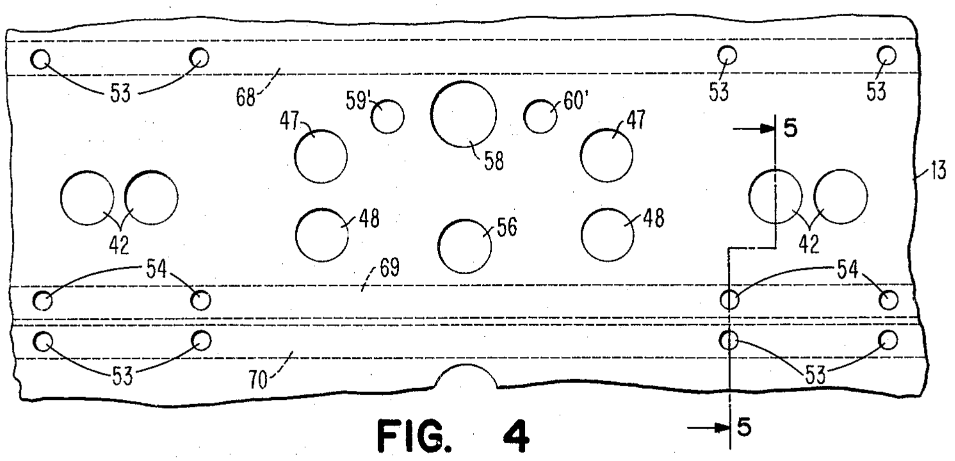
Figure 5:
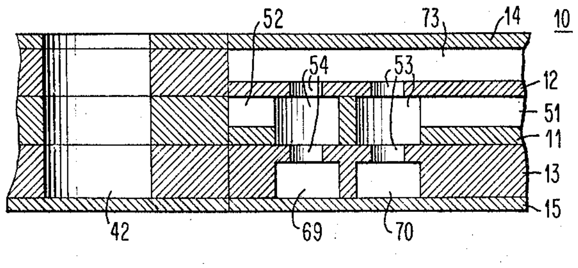
Figure 6:
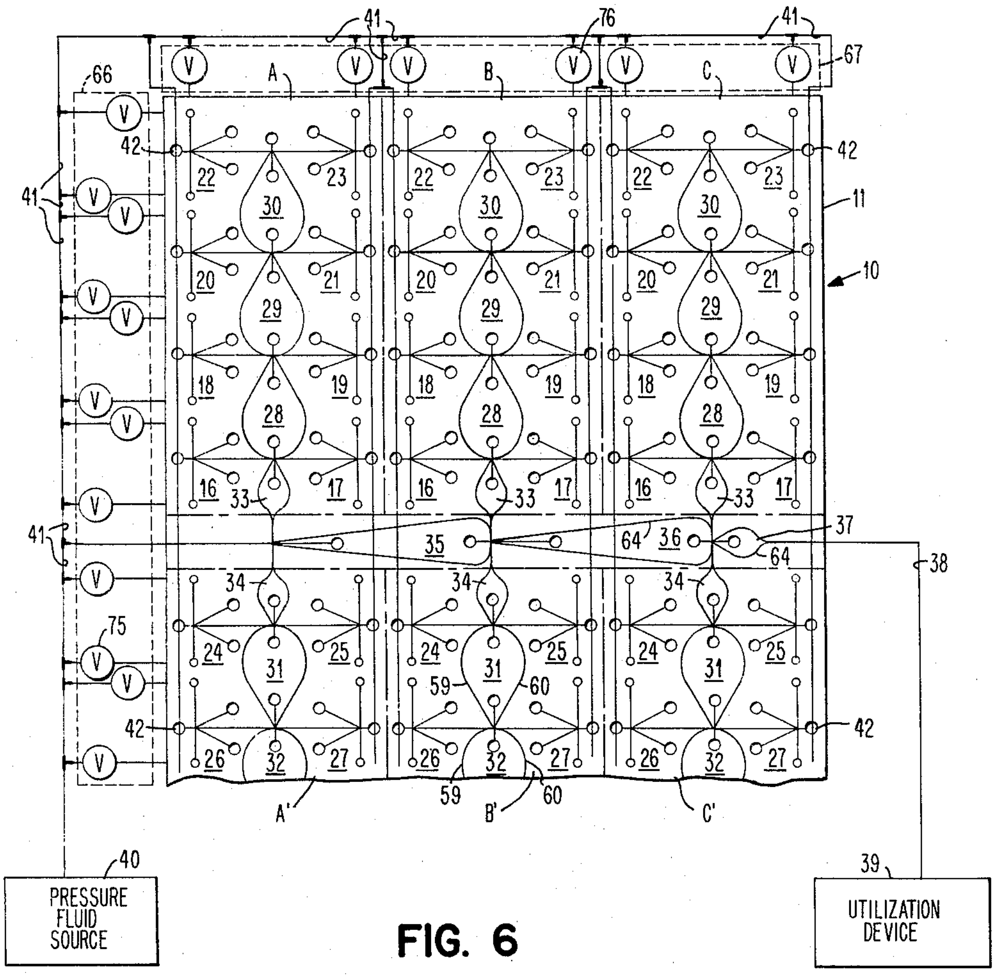

The foregoing and other objects, features and advantages of the invention will be apparent from the following more particular description of the fluid memory embodying the invention and illustrated in the accompanying drawings, wherein:

FIG. 1 is a plan view of a portion of a main or element plate of a fluid memory embodying a plurality of sandwiched plates;

FIGS. 2, 3, and 4 are fragmentary plan views of overlying portions of an upper circuit plate, the element plate, and a lower circuit plate of the memory sandwich;

FIG. 5 is a section view, to enlarged scale, taken along the lines 5—5 of FIGS. 2, 3, and 4; and FIG. 6 is a schematic view, to reduced scale, of the element plate of the memory and of the means for supplying coincident X and Y grid co-ordinate signals to control ports in said plate and transmitting an output signal from any fluid storage element in said plate to a utilization device.

*Description*

As illustrated in the drawings and best shown in FIGS. 1 and 5, a fluid memory 10 embodying the invention is in the form of a matrix or array comprising a main or element plate 11 sandwiched between an upper circuit plate 12 and a lower circuit plate 13. A cover plate 14 overlies and seals the upper surface of upper circuit plate 12, and a cover plate 15 abuts and seals the lower surface of lower circuit plate 13.

Referring now to FIGS. 1 and 6, the element plate 11 comprises associated pairs of bistable fluid storage elements, such as 16–17, 18–19, 20–21, 22–23, 24–25, and 26–27. Element plate 11 also comprises a series of amplifier-type propagating elements, such as 28, 29, 30, 31, 32, as well as combined propagating and merging elements, such as 33, 34. Element plate 11 also preferably, although not necessarily, comprises transversely disposed amplifier-type propagating elements, such as 35, 36, as well as an associated transversely disposed combined propagating and merging element 37 that channels an output pulse to a single output line 38 leading to a utilization device 39. Each of these storage elements 16 to 27, propagating elements 28 to 32, 35 and 36 and elements 33, 34 and 37 may be formed by etching appropiate channels and cavities in one side (the top side, as illustrated) of the element plate 11, and then drilling the requisite ports through said plate following techniques heretofore proposed and forming no part of the present invention.

Pressure fluid is supplied from a suitable pressure fluid source 40 (FIG. 6) via branches of a conduit 41 to the respective inlets 42 of each storage element 16 through 27. In each storage element, the fluid flow is from the respective inlet 42 through a corresponding nozzle 43 (FIG. 1) and into a chamber defined in part by walls 45, 46. These side walls 45, 46 diverge at an acute angle from the exit end of the nozzle and lead to two spaced outlets or escape ports 47, 48, respectively.

The fluid power stream discharged from nozzle 43 is caused to attach selectively to side walls 45 or 46, thereby to define the two bistable states of the particular storage elements 16 to 27. This attachment characteristic may be accomplished by having the side walls 45, 46 set back somewhat from the exit end of the corresponding nozzle 43 or at least diverge at such an angle therefrom as to create respective boundary layer control regions 49, 50. These regions 49, 50 exist substantially at the mouths of respective control channels 51, 52 that open through the side walls of the chamber at the exit end of the nozzle 43. Pressure fluid pulses are supplied selectively to a selected control channel 51 or 52 via respective control ports 53, 54 to enlarge the separation bubble in the corresponding control region 49, 50, thereby to effect switching of the fluid power stream in a particular one of the storage elements 16 through 27. As the power stream is switched from one side wall 45 or 46 to the other, and irrespective of the direction in which it is switched, a transient fluid pressure pulse or output signal will be delivered to an outlet or channel 55 that is disposed between the spaced outlets 47, 48, for reasons presently to be explained.

The amplifier-type propagating elements 28 to 32 each comprise an inlet 56 which is supplied with pressure fluid from source 40 via suitable conduits (not shown, but like conduits 41). In each propagating element, the fluid stream flows from inlet 56 through a respective nozzle 57 and normally follows a straight path and discharges into an escape port 58. However, the storage elements of each pair are arranged "face-to-face" as shown in FIGS. 1, 3 and 6 such that the respective channels 55 of each pair of associated storage elements are substantially coaxially aligned and disposed at opposite sides of the stream flowing through an intervening one of the propagating elements 28 to 32.

Each of the elements 28 to 32 also comprises (see FIG. 1) a pair of output lines 59, 60 that initially diverge at substantially equal angles from the exit end of the respective nozzle 57. At a point beyond respective auxiliary escape ports 59′, 60′, the output lines 59, 60 respectively converge toward the exit end of the nozzle of the next element in the sequence through which the output signal is to be propagated. The converging ends of each output line 59 or 60 merge with a corresponding channel 55 to perform a logical OR function whereby upon supply of a pressure fluid pulse either to a channel 55 or to the associated output line 59 (or 60), the stream flowing through the particular element 28 to 32 will be diverted from the corresponding escape port 58 into the associated output line 59 (or 60). Thus, an output pulse delivered to output line 59, for example, in one propagating element, like 32, will be amplified and transmitted to corresponding output lines 59 of successive propagating elements.

The combined propagating and merging elements, such as 33, 34, are like the propagating elements 28 to 32 except that they merge, into a single output line 61, the output signals delivered to either line 59 or 60 (see FIG. 1).

Delay in converting a transient fluid presure pulse from a remote storage element (like 22, in FIG. 6) into an output signal in line 38 is minimized in the preferred embodiment illustrated, by employing the series of propagating elements, like 35, 36. These elements 35, 36 are structurally identical with the elements 28 to 32 but (as best shown in FIG. 6) are disposed transversely thereof and between two banks of side-by-side arranged modules, like A, B, C and A′, B′, C′. This reduces the distance the output signal pulse must travel to reach output line 38, and thus desirably reduces the transmission and response times from the inception of the transient pulse to the delivery of the amplified output signal to utilization device 39.

In each amplifier-type propagating element 35, 36, a fluid stream flows from an outlet 62 and normally discharges into an escape port 63. When a transient pulse is transmitted, for example, either to line 61 of element 34, or to an output propagating line 64 of element 35, the stream in the propagating element 36 will be diverted to the corresponding output line 64. Similarly, when a transient pulse is transmitted either to line 61 of propagating-merging element 33 or to an output line 65 of element 35, the stream in propagating element 36 will be diverted from escape port 63 into output line 65 in element 36.

The propagating-merging element 37 (like the elements 33, 34) will not only propagate an amplified signal to one of the lines 64, 65 but will then merge these lines into a single line (equivalent to 61) constituting an extension of the output line 38.

It is to be noted that the elements 28 to 34 each have very short side walls that diverge at acute angles from the exit ends of the respective nozzles 57 and terminate at auxiliary escape ports 59′, 60′ formed in the outer walls of the output lines 59, 60, respectively. These short side walls assure that the fluid stream in each such element 28 to 34 will normally discharge into the corresponding escape port 58 and never attach to either of said side walls. In addition to defining the termination point of the side walls, the auxiliary escape ports 59′, 60′, bleed off any exces pressure fluid when the fluid stream is diverted into the respective output line 59 or 60. The divergent side walls in elements 35, 36, 37 are short and terminate at auxiliary escape ports 64′, 65′ in output lines 64, 65, respectively, for the same reasons as just explained in connection with the auxiliary escape ports 59′, 60′.

Switching of the fluid power stream in a selected one of the fluid storage elements 16 to 27 is controlled by suitable X and Y grid co-ordinate type addressing devices, designated generally 66, 67. By way of illustration, these addressing devices are shown as comprising a plurality of solenoid valves V which are selectively operable by suitable electrical circuitry (not shown). Thus, energization of any of the twelve valves V shown as forming part of the addressing device 66 controls selective supply of pressure fluid to any one of twelve corresponding X grid co-ordinate channels, of which those designated as 68, 69, 70 are illustrated in FIG. 4. Similarly, energization of any of the six valves V of the addressing device 67 controls selective supply of pressure fluid to a corresponding one of the six Y grid co-ordinate channels, of which those designated as 71, 72, 73, 74 are illustrated in FIG. 2.

In the arrangement illustrated, when any of the valves V is deenergized, it will cut off the corresponding co-ordinate channel from the source 40 and vent such channel. As a result, if pressure fluid is supplied to a Y grid channel, like 73 (FIG. 5) and to X grid channel 69, but not channel 70, pressure fluid from channel 73 will flow through the intervening port 53 and escape through the then vented channel 70. The action that will take place in the port 54 lying between the concurrently charged channels 73, 69 will be explained subsequently.

*Summary of operation*

Assume initially that the source 40 is charged with fluid under pressure; that all of the valves V of the addressing devices 66, 67 are deenergized to vent the corresponding X and Y grid co-ordinate channels; that the fluid power stream in each storage element 16 to 27 are in either one of their stable states defined by attachment or "lock on" to either wall 45 or 46. Assume further that a storage element 16 to 27 is deemed to be in the "0" state when the fluid power stream exits through the corresponding outlet 47, and in the "1" state when said stream exits through the other outlet 48.

Assume now that the particular valves V designated as 75 and 76 (FIG. 6) of the X and Y addressing devices 66, 67 are concurrently energized to supply pressure fluid concurrently to X channel 69 (FIG. 4) and Y channel 73 (FIG. 2) as illustrated in FIG. 5, the pressure fluid supplied to channel 73 will flow downwardly through control port 54 and the pressure fluid supplied to channel 69 will flow upwardly through control port 54, such that both streams will collide within the element plate 11 adjacent the control channel 52. By virtue of this collision of the intersecting streams, a logical AND pulse will be created by lateral flow of pressure fluid via control channel 52 of storage element 25 to the corresponding control region 50 (FIG. 1). If the power stream in element 25 is then discharging through outlet 48 and the element is therefore in the "1" state per the convention above assumed, the fluid pulse supplied to the control region 50 will enlarge the separation bubble at said region and cause the stream to switch from wall 46 of element 25 and attach to the opposite wall 45.

As the power stream switches from wall 46 to wall 45, it will momentarily sweep across and discharge into channel 55 of element 25. This will supply to channel 55 a transient pulse that will die by the time the stream attaches to wall 45. Meanwhile, this transient pulse will be of sufficient duration to temporarily divert the fluid stream and element 34 from escape port 58 of said element into the corresponding output line 59. The output signal or pulse thus supplied to line 59 of element 34 will be transmitted via the single line 61 and divert the fluid stream in propagating element 36 from escape port 63 into output line 64 to provide an amplified output signal therein. This amplified signal will, in turn, divert the fluid stream in element 37 (see FIG. 6) into the corresponding output line 64, whence it will be transmitted via the single line 38 to the utilization device 39.

If the valves 75, 76 are again energized while the stream in element 25 is attached to wall 45, the pulse consequently transmitted to corresponding control channel 52 will be ineffective. In other words, since the stream is already attached to wall 45, it will not be switched and hence no transient pulse will be conveyed to channel 55 for amplification and propagation to the utilization device 39. The absence of an output signal in line 38 will thus indicate that the particular storage element 25 was in its "0" state at the time the inquiry was addressed to said storage element.

It will thus be seen that, in similar manner, pressure fluid may be concurrently supplied to any selected pair of X and Y addressing channels to produce an inquiry or input pulse in the particular control port and control channel corresponding to that selected grid location. If the stream is attached to the wall nearest the particular control channel, to which the input pulse is supplied the stream will be switched to the remote or opposite wall, thus generating the transient pulse that, after amplification and propagation, is delivered to the utilization device 39 to indicate that the bit of information desired was present. Thus, in view of the assumed convention, all of the control ports 53 will be "set" ports, each chargeable with pressure fluid to set the corresponding storage element from its "0" state to its "1" state; whereas all of the control ports 54 are "reset" ports, each chargeable with pressure fluid to cause switching of the stream and hence a transient pulse and output signal only if the particular storage element is in its "1" state when the reset port is charged.

While the invention has been particularly shown and described with reference to a preferred embodiment, it will be understood by those skilled in the art that other changes in form and details may be made therein without departing from the spirit and scope of the invention.

What is claimed is:

1. Apparatus for storing binary information and for retrieving the same, comprising a fluid storage element having two stable states defined by a fluid power stream being discharged selectively through one or the other of two outlets, control means including control ports selectively chargeable with a control pressure fluid separate from the power stream fluid for switching the stream selectively to said outlets and thereby to its said states, means for conveying a fluid pressure output pulse only while and during the time the stream is being switched from either of the outlets to the other outlet, whereby said pulse will be conveyed only if the control means effects switching of the stream, and means operable responsively to each output pulse.

2. Apparatus for storing binary information and for retrieving the same, comprising a plurality of fluid storage elements each having two stable states defined by a respective fluid power stream being discharged selectively from one or the other of a corresponding two outlets, means providing a plurality of ports arranged schematically in columns and rows, addressing means for selectively applying fluid pressure pulses to a selectable one of said ports, a respective control channel connected to each such port for receiving and directing such pulses toward a corresponding stream to switch such stream from one of the outlets of a particular element to the other outlet of that same element, and a respective other channel disposed between the said outlets in each storage element for receiving and conveying a fluid pressure output signal only during the transient time interval each time the stream in the corresponding element is switched in either direction from one outlet to the other outlet.

3. Apparatus according to claim 2, including a single output line, and means connected to said other channel of each said element and responsive to an output signal in the said other channel of any of said elements to transmit an amplified signal to said output line.

4. A fluid memory comprising at least one bistable fluid storage element having two spaced outlets into which a fluid power stream is selectively switchable to represent bits of binary information, and a channel between said outlets for receiving a transient pulse whenever the stream is switched in either direction, and means responsive to one or the other of two input signals to switch the stream selectively to a corresponding one or the other of said outlets, whereby a transient pulse will be obtained in said channel only if the particular input signal causes switching of the stream.

5. A fluid memory comprising means providing an inlet for receiving a fluid power stream, two outlets donwstream of the inlet and arranged in divergent relation thereto and into which the stream is selectively switchable to assume either of two bistable states, and a channel disposed between said outlets, and means providing fluid pressure addressing signals for controlling switching of the stream selectively to said outlets and incident thereto to provide in said channel a transient output pulse irrespective of the direction in which the stream is switched, whereby the presence or absence of a bit of fluid logic information represented by such bistable states will be detected by the presence or absence of said transient pulse.

6. A fluid memory comprising a plurality of fluid storage elements each having two spaced outlets into which a fluid power stream is selectively switchable to define two stable states representing the presence or absence of a bit of binary information, and a respective channel disposed between the corresponding outlets for receiving a transient pulse whenever the respective stream is switched in either direction, means providing a port for normally receiving another fluid stream which flows in a path between the respective channels of a group of said elements, an output line, and means providing a sense output signal in said output line respetcively to supply a ransient pulse to the channels of any one of said elements.

7. A fluid memory comprising at least one pair of fluid storage elements, each element having two spaced outlets into which a fluid power stream is selectively switchable to define two stable states representing the presence or absence of a bit of binary information, and a rescpective channel disposed between the corresponding outlets for receiving a transient pulse whenever the respective stream is switched in either direction, the elements of each pair being arranged substantially "face-to-face" so that their respective channels extend toward each other, means providing a port for normally receiving another fluid stream which flows in a path between the associated pairs of channels, and means providing two sense-output lines into which said other stream is selectively divertable by a transient pulse supplied to either of said channels to propagate an amplified fluid pressure output pulse signal.

8. A fluid memory comprising means providing a plurality of fluid storage elements, each having control ports, two spaced outlets into which a fluid power stream is selectively switchable to define two stable states representing the presence or absence of a bit of binary information, and a respective channel disposed between the corresponding outlets for receiving a transient pulse whenever the respective stream is switched in either direction, two members disposed at opposite sides of the element-providing means in which said control ports are formed, one of said members providing one set of parallel addressing channels which are disposed at substantially right angles to another set of parallel addressing channels provided in the other member to constitute a grid-type pattern, means for supplying pressure fluid selectively to any of the control ports by concurrent supply of pressure fluid to a selectable pair of addressing channels, one in each such member, which channels are separated by the means in which the control ports are provided, such that the momentum of the colliding streams supplied via the selected addressing channels produces a fluid flow in the corresponding selected control port to develop a fluid pressure signal therein which will switch the stream to that outlet remote from the selected control port if the stream is not already discharging into such remote outlet, an output line, and means including the first-mentioned channels for transmitting an output signal to said output line whenever a stream in any of the elements is switched in either direction.

9. A fluid memory comprising at least one pair of bistable fluid storage elements, each such element including means providing an inlet for receiving a fluid power stream, two outlets downstream of the inlet and arranged in divergent relation thereto and into which the respective stream is selectively switchable, and a channel disposed between said outlets, means controlling the switching of each stream selectively to the corresponding outlets of each element and incident thereto to provide in the corresponding channel a transient fluid pressure pulse irrespective of the direction in which the corresponding stream is switched, propagating means including two output lines, and another fluid stream which normally flows in a predetermined path between the respective channels of each pair of elements and is divertable from said path into one or the other of said output lines by a transient fluid pressure pulse supplied to one of such channels, and means for merging the output lines to provide an output signal whenever and irrespective of which power stream is switched.

10. A fluid memory array comprising a plurality of pairs of bistable fluid storage elements, each such element including means providing an inlet for receiving a fluid power stream, two outlets downstream of the inlet and arranged in divergent relation thereto and into which the respective stream is selectively switchable, and a channel disposed between said outlets, means including control ports, at least two per element, for controlling switching of each stream selectively to the corresponding outlets of each element to provide in the corresponding channel a transient fluid pressure pulse irrespective of the direction in which the corresponding stream is switched, and means including a co-ordinate system for supplying other streams of pressure fluid concurrently to selectable X and Y co-ordinate positions, one such position per control port, for causing collision of said other streams to produce a control pulse in a corresponding one of the control ports, and means for amplifying and propagating a fluid pressure output signal whenever a transient pulse is provided in one of said channels, whereby the presence or absence of a bit of fluid logic information represented by such bistable states will be detected by the presence or absence of said output signal.

11. A fluid memory array according to claim 10, wherein one of the control ports associated with each element is a set port to which pressure fluid is supplied to switch the element to one state to store a bit of binary information therein, and a second control port associated with each element is a reset port to which pressure fluid is supplied to switch the element to its other state.

References Cited by the Examiner

UNITED STATES PATENTS

| | | | |
|---|---|---|---|
| 3,024,805 | 3/1962 | Horton | 137—81.5 |
| 3,075,548 | 1/1963 | Horton | 137—81.5 X |
| 3,093,306 | 6/1963 | Warren | 137—81.5 X |
| 3,107,850 | 10/1963 | Warren et al. | 137—81.5 |
| 3,128,040 | 4/1964 | Norwood | 235—201 |
| 3,148,691 | 9/1964 | Greenblott | 137—81.5 |
| 3,155,825 | 11/1964 | Boothe | 235—201 |
| 3,159,168 | 12/1964 | Reader | 137—81.5 |
| 3,159,169 | 12/1964 | Reader | 137—81.5 |

OTHER REFERENCES

Society of Automotive Engineers, October 1961, pages 91 to 93, FIGURE 5.

M. CARY NELSON, *Primary Examiner.*

LAVERNE D. GEIGER, *Examiner.*